May 7, 1940.                E. KRUCK                 2,199,955
                     FORCE MEASURING DEVICE
                     Filed Dec. 17, 1937           2 Sheets-Sheet 1
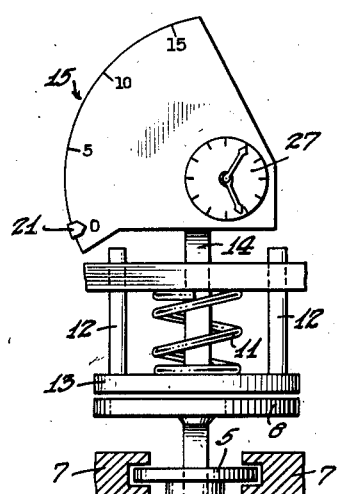
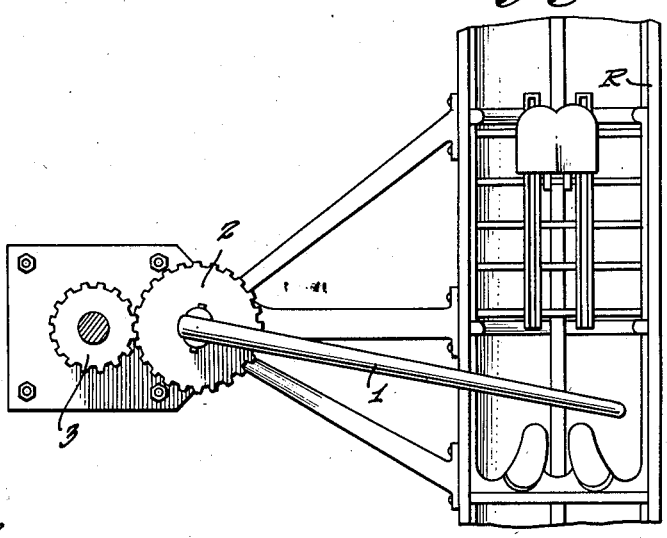
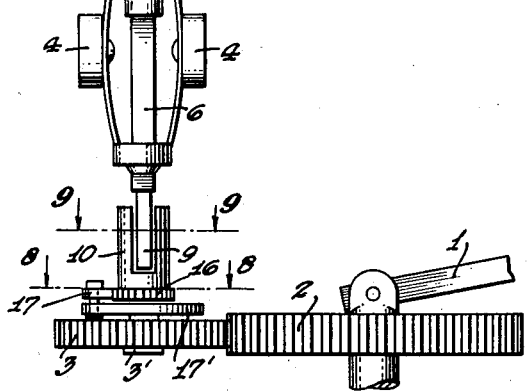
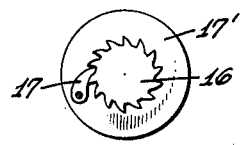
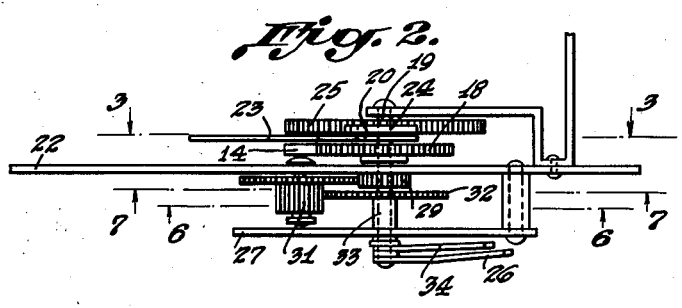
Inventor:
EUGEN KRUCK
By Walter S. Bleston
Attorney May 7, 1940.  E. KRUCK  2,199,955
FORCE MEASURING DEVICE
Filed Dec. 17, 1937  2 Sheets-Sheet 2

Inventor:
EUGEN KRUCK
By Walter S. Bleston
Attorney

Patented May 7, 1940

2,199,955

UNITED STATES PATENT OFFICE 2,199,955

FORCE MEASURING DEVICE

Eugen Kruck, Neu-Isenburg, Germany

Application December 17, 1937, Serial No. 180,282

3 Claims. (Cl. 265—22)

This invention relates to a rowing exercising apparatus having a measuring device, which is rotated by the movement of the oars, and automatically braked, by means of which the length of the individual strokes or the power applied to the oars can be measured, and by which also the lengths of a number of strokes, which may be of differing lengths, can be totalled over any desired period of time.

The rowing exercising apparatus consists of a framework which may be composed in known manner of steel tubes and can be taken to pieces and is provided with a roller track and a stretcher. The measuring device which is illustrated in the drawings is fitted to the framework. In the drawings:

Figure 1 is a front elevation of the new measuring device,

Figure 1a is a top view of a rowing apparatus to which the measuring device according to my invention may be applied, Figure 2 is a top view of the indicating device of Figure 1.

Figure 8 is a section on the line 8—8 of Figure 1, and

Figure 3:
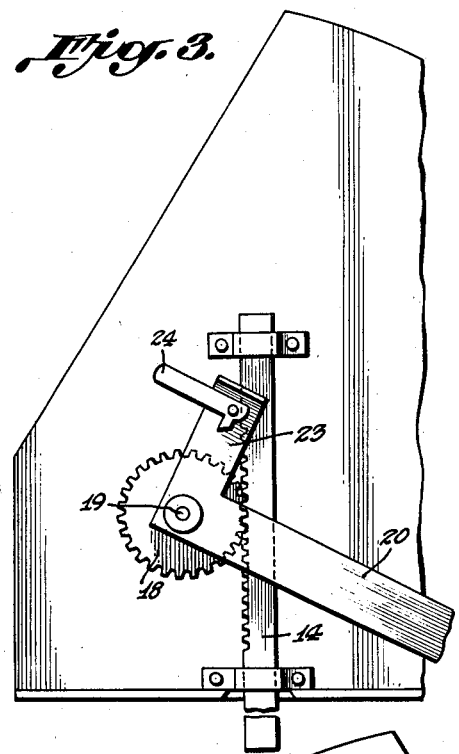
Figure 3 is a view of the indicating device on the line 3—3 of Figure 2.
Figure 4:
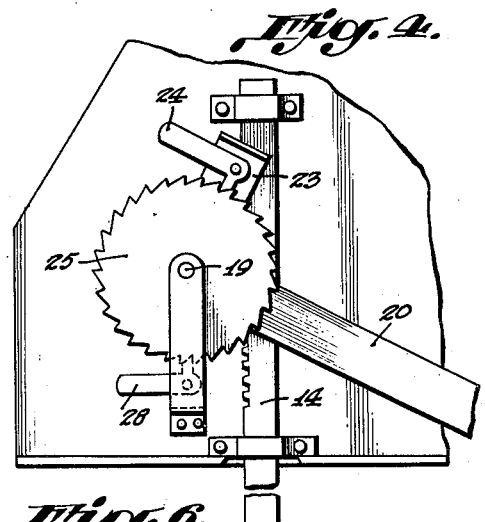
Figure 4 is a rear view of the indicating device.
Figure 6:
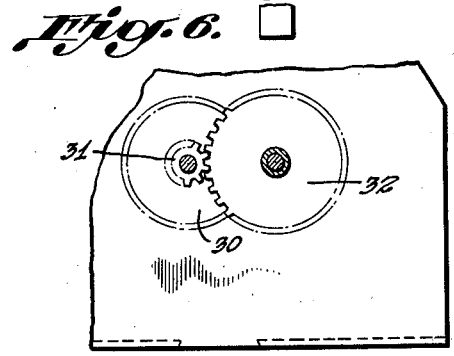
Figure 6 is a section of the indicating device on the line 6—6 of Figure 2.
Figure 5:
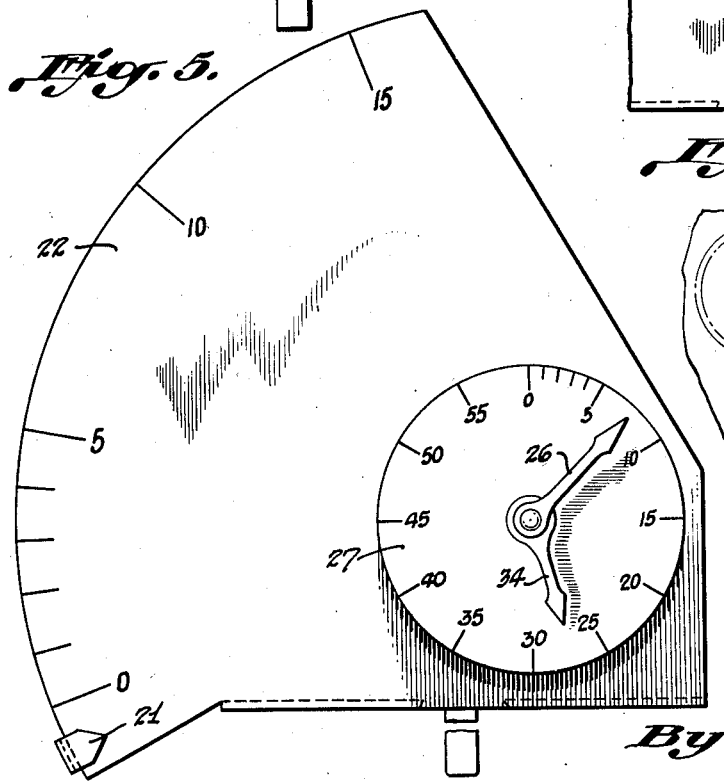
Figure 5 is a front elevation of the indicating device.
Figure 7:
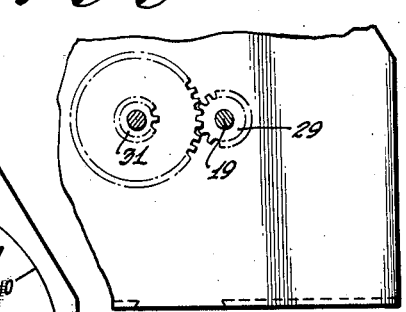
Figure 7 is a section on the line 7—7 of Figure 2.

Figure 9 a section on the line 9—9 of Figure 1.

Referring to the drawings, the measuring device is caused to rotate by the rower seated in the aforesaid framework R by moving the oar 1 which is connected to a toothed wheel 2 which meshes with a toothed wheel 3 provided on the measuring device.

This rotation actuates a centrifugal governor 4, which is arranged in such a manner that the square or rectangular shaft 6, and not the governor disc 5, is longitudinally displaceable. The governor disc 5 can only rotate in a fixed guide 7. On the longitudinally displaceable shaft 6 is provided a disc 8 which acts as a brake disc.

The shaft 6 is coupled to the driving toothed wheel 3 in such a manner that it is axially displaceable independently of this toothed wheel, for which purpose it is fitted loosely in a recess 9 in the end 10 of the shaft 3' of wheel 3. When the apparatus is rotated, the balls or weights of the governor 4 cause the shaft 6 to move upwards and thereby press the disc 8 against a disc 13 which is fixed to guide pins 12. The disc 13 is not able to rotate but can move upwardly against the pressure of a spring 11, whereby the stroke of the oar 1 or the power applied for moving the oar is braked.

This movement of the disc 8 against the spring-loaded disc 13 is transferred through the agency of a rack 14 fixed to the disc 13 to an indicating device 15 which is hereinafter described in greater detail and is visibly indicated by this device. It is clear that the longer the stroke of the oar 1 is, the more quickly it is moved in a unit of time, and the greater the power which is applied to it, the more rapidly is the centrifugal governor rotated. Owing to the centrifugal force due to such rotation the governor will lift disc 8 so as to bear against disc 13 and to raise the latter. This movement is resisted by spring 11 acting on disc 13. The force with which spring 13 will be compressed is a braking force applied to disc 8 and, hence, to the movement of the oar. Consequently, the compression of the spring is a measure for the power applied to the oar. Since, furthermore, the acceleration of the governor, and, thus, its centrifugal force depend on the length of the stroke over time, the compression of the spring 11 may serve not only as a measure for the power applied to the oar, but also for the lengths of the strokes provided the number of strokes per time unit are counted. The toothed wheel 3 and the governor 4 are disconnected in one direction of rotation by the ratchet wheel 16 and the pawl 17 (Figure 8) which is pivoted on a disc 17' so that the oar 1 can be returned to the starting position after each stroke.

The rack 14 transmits the movement of the disc 13 to the toothed wheel 18 of the indicating device 15 (Figures 2 and 3), the wheel 18 being mounted freely on the shaft 19. To the toothed wheel 18 is fixed a pointer 20, the free end 21 of which swings over the numeral dial 22, as the toothed wheel 18 is rotated and indicates the displacement of the disc 13 or the length of the stroke and the power which is applied to the oar 1.

On an arm 23 of the pointer 20 is mounted a pawl or driver 24 which drives the wheel 25 which is fixed to the shaft 19. At the other end of the shaft 19 is fixed a pointer 26 by which the length of the stroke or the power which is applied to the oars can likewise be read off on the dial 27 in accordance with the rotation of the wheel 25.

Since after each stroke, the rack 14 which is in engagement with the toothed wheel 18 which is loose on the shaft 19 returns to the starting position, the pointer 20 also returns before the beginning of every stroke to the zero position on the dial 22. The wheel 25 on the other hand is prevented by a pawl 28 from returning to its original position after each stroke, consequently at the end of each stroke the pointer 26 remains stationary. On the following stroke the pointer 26 is moved further by an amount which depends on the length of the stroke and the power applied to the oars, so that the length of the individual strokes or the powers which are applied to the oars are totalled on the dial 27. Thus, whereas the pointer 21, indicates on the dial 22 the length of the individual strokes or the displacement of the disc 13 and therefore the power which is applied to the oar 1 and is returned to the original position again after each stroke, the pointer 26 after every completed stroke moves further over the dial 27 in accordance with the length of the stroke and the power applied to the oars and thus indicates the sum of the lengths of a definite number of strokes or the sum of the force expended.

A small toothed wheel 29 which rotates a large toothed wheel 30 is also fixed on the shaft 19. The toothed wheel 30 carries a small toothed wheel 31 which in turn rotates a large toothed wheel 32. A small pointer 34 is mounted on the shaft 33 of the toothed wheel 32. A reduction ratio of 12 to 1 is obtained by means of the toothed wheels 29, 30, 31, 32. Thus when the pointer 26 has rotated twelve times the pointer 34 has rotated only once.

It will be seen therefore that with the new device the lengths of the individual strokes and simultaneously also the total lengths of the strokes or the power expended in moving the oars over a definite period of time can be measured, while at the same time the strokes are automatically braked.

I claim:

1. In a rowing exercising apparatus, the combination of an oar with a centrifugal device, means for rotating the centrifugal device when the oar is moved in one direction, including means for enabling the oar to be moved in the opposite direction without rotating the centrifugal device, a shaft which is axially displaced owing to the rotation of the centrifugal device, a disc on said shaft, a braking disc with which said former disc can coact, means for supporting said braking disc in such a manner that it is able to move in the direction of movement of said shaft and disc but cannot rotate, a spring which presses the braking disc towards the shaft disc, a rack connected to said braking disc and means for indicating the movements of the rack and braking disc as a measure for the lengths of the strokes.

2. A rowing exercising apparatus comprising an oar, a centrifugal device which is rotated by the movement of the oar, a shaft which is axially displaceable by the centrifugal device, a disc on the end of the shaft, a braking disc which is non-revolubly arranged closely above the former disc but is longitudinally displaceable, a spring bearing on said braking disc so as to resist displacement thereof, a rack fixed to said braking disc and an indicating and measuring device which is actuated by the movement of said rack, whereby the indications of said last mentioned device are a measure for the lengths of the strokes of said oar, the sum of the lengths of the number of strokes and the power applied to the oar.

3. An exercising apparatus in accordance with claim 1, the said indicating means comprises a shaft, a toothed wheel which rotates freely on said shaft, a dial, a pointer which is fixed to the toothed wheel and moves over said dial and indicates the lengths of the separate strokes of the oar and the power applied, a driver fixed on said pointer, a wheel fixed on the said shaft and driven by said driver, and rotated in accordance with the movements of the pointer, a pawl which coacts with said wheel, a second dial, a second pointer which is fixed on said shaft and moves over said second dial and indicates the sum of the lengths of any desired number of strokes and of the power applied to the oars, a reduction gear actuated by the said shaft, and a third pointer which is moved over the second dial by said reduction gear and makes one revolution while the pointer fixed on said shaft makes any predetermined number of revolutions.

EUGEN KRUCK.